US012679165B1

(12) United States Patent
Argenziano et al.

(10) Patent No.: US 12,679,165 B1
(45) Date of Patent: Jul. 14, 2026

(54) HYDRAULIC SYSTEMS FOR MOBILE MACHINES AND ASSOCIATED METHODS

(71) Applicant: Caterpillar Paving Products Inc., Brooklyn Park, MN (US)

(72) Inventors: Nicholas J. Argenziano, Otsego, MN (US); Jason W. Muir, Andover, MN (US); Jacob M. Saari, Nowthen, MN (US)

(73) Assignee: Caterpillar Paving Products Inc., Brooklyn Park, MN (US)

( * ) Notice: Subject to any disclaimer, the term of this patent is extended or adjusted under 35 U.S.C. 154(b) by 0 days.

(21) Appl. No.: 19/216,007

(22) Filed: May 22, 2025

(51) Int. Cl.
B60G 21/10 (2006.01)
B60G 21/073 (2006.01)
E02F 9/22 (2006.01)

(52) U.S. Cl.
CPC ......... B60G 21/106 (2013.01); B60G 21/073 (2013.01); E02F 9/2257 (2013.01); *B60G 2204/8304* (2013.01); *F15B 2211/7114* (2013.01); *F15B 2211/7128* (2013.01)

(58) Field of Classification Search
CPC ............... B60G 21/073; B60G 21/106; B60G 2204/8304; E02F 9/2257; F15B 2211/7114; F15B 2211/7128
See application file for complete search history.

(56) References Cited

U.S. PATENT DOCUMENTS

| | | | |
|---|---|---|---|
| 6,669,216 B1* | 12/2003 | Elser ................. | B60G 17/0432 |
| | | | 280/124.159 |
| 8,973,688 B2 | 3/2015 | Steffen | |
| 11,193,246 B2 | 12/2021 | Schlenker et al. | |
| 11,351,829 B2 | 6/2022 | Stahl | |
| 11,795,664 B2 | 10/2023 | Argenziano et al. | |
| 11,932,327 B2 | 3/2024 | Argenziano et al. | |
| 2006/0055129 A1* | 3/2006 | Amano ................. | B60G 17/015 |
| | | | 280/5.514 |
| 2013/0153310 A1* | 6/2013 | Steffen ................. | B62D 55/116 |
| | | | 180/9.5 |
| 2016/0200164 A1* | 7/2016 | Tabata ................. | B60G 21/073 |
| | | | 280/5.508 |
| 2018/0079275 A1* | 3/2018 | Sawai .................... | B60G 17/08 |
| 2019/0359025 A1* | 11/2019 | Wager ................. | B60G 21/005 |
| 2022/0186447 A1* | 6/2022 | Muir ......................... | F15B 1/02 |

FOREIGN PATENT DOCUMENTS

| | | | |
|---|---|---|---|
| CN | 109973447 B | 8/2020 | |
| WO | WO-2012083663 A1 * | 6/2012 | ......... B60G 17/0432 |

* cited by examiner

*Primary Examiner* — Matthew Wiblin

(57) ABSTRACT

A mobile machine including: a frame; at least left and right propulsion devices on left and right sides of the mobile machine; and a hydraulic system including: a left hydraulic cylinder configured to adjust a distance between the frame and the left propulsion device, and having a rod end and a blind end; a right hydraulic cylinder configured to adjust a distance between the frame and the right propulsion device, and having a rod end and a blind end; a first valve set movable between positions permitting and preventing flow of hydraulic fluid between the rod ends of the left and hydraulic cylinders; and a second valve set movable between positions permitting and preventing the flow of the hydraulic fluid between the blind ends of the left and right hydraulic cylinders.

20 Claims, 4 Drawing Sheets

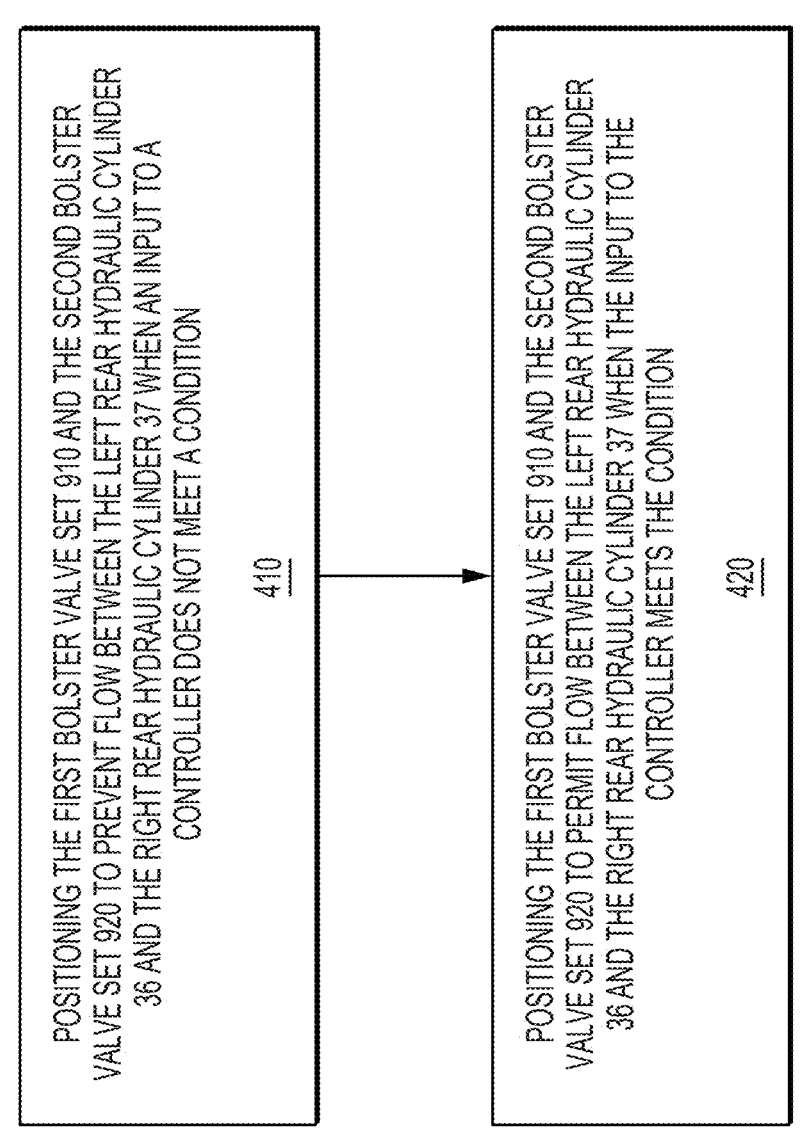

POSITIONING THE FIRST BOLSTER VALVE SET 910 AND THE SECOND BOLSTER VALVE SET 920 TO PREVENT FLOW BETWEEN THE LEFT REAR HYDRAULIC CYLINDER 36 AND THE RIGHT REAR HYDRAULIC CYLINDER 37 WHEN AN INPUT TO A CONTROLLER DOES NOT MEET A CONDITION
410

POSITIONING THE FIRST BOLSTER VALVE SET 910 AND THE SECOND BOLSTER VALVE SET 920 TO PERMIT FLOW BETWEEN THE LEFT REAR HYDRAULIC CYLINDER 36 AND THE RIGHT REAR HYDRAULIC CYLINDER 37 WHEN THE INPUT TO THE CONTROLLER MEETS THE CONDITION
420

*FIG. 4*

HYDRAULIC SYSTEMS FOR MOBILE MACHINES AND ASSOCIATED METHODS

TECHNICAL FIELD

The present disclosure relates generally to hydraulic systems for mobile machines and associated methods, and, more particularly, to hydraulic systems for mobile machines and associated methods for controlling the position of one or more movable legs that are connected to tires or other propulsion devices for mobile machines.

BACKGROUND

Some types of mobile machine, such as milling machines, are used to remove or reshape materials from ground surfaces. For example, milling machines, which include road reclaimers (sometimes referred to as rotary mixers), cold planers, and other machines, are used for reclamation of asphalt or soil-based roadways for road rehabilitation, soil stabilization, surface mining, bio-remediation, agriculture, or other applications. Milling machines include rotor assemblies, which are selectively deployable to pulverize the ground surfaces beneath the machines. Some milling machines use four tires to propel the machine over the ground surface, while some milling machines use four sets of crawler tracks. Often, the position of the tires or crawler tracks (e.g., the distance between the frame and the tires or crawler tracks) is controllable, such as by the operators of the machines, through adjustment of the hydraulic cylinders associated with the tires or crawler tracks. This adjustment helps stabilize the machines, such as when the milling machines are traveling over uneven ground surfaces.

U.S. Pat. No. 11,351,829 to Stahl ("the '829 patent") is directed to a milling machine that includes four traveling devices, which are in the form of four sets of crawler tracks. The two rear traveling devices are connected by a swing axle, and the two front traveling devices are connected by a locking axle. A controller controls the orientation of the swing axle, and thus the heights of the rear traveling devices connected to the swing axle, based on a load on the locking axle. While the '829 patent stabilizes the milling machine under some circumstances, because the '829 patent controls the pivoting of the swing axle based on the load on the locking axle, the '829 patent may not adequately keep the tires of the milling machine in contact with the ground surface under other conditions.

Accordingly, systems and methods according to the present disclosure may address or solve one or more problems in the art. The scope of the current disclosure, however, is defined by the attached claims, and not by the ability to solve any specific problem.

SUMMARY

In some aspects, a mobile machine may include: a frame; a plurality of propulsion devices supported by the frame, the plurality of propulsion devices including at least a left propulsion device on a left side of the mobile machine, and a right propulsion device on a right side of the mobile machine; and a hydraulic system, which may include: a left hydraulic cylinder configured to adjust a distance between the frame and the left propulsion device, the left hydraulic cylinder including a rod end and a blind end; a right hydraulic cylinder configured to adjust a distance between the frame and the right propulsion device, the right hydraulic cylinder including a rod end and a blind end; a first valve set movable between positions permitting and preventing flow of hydraulic fluid between the rod end of the left hydraulic cylinder and the rod end of the right hydraulic cylinder; and a second valve set movable between positions permitting and preventing the flow of the hydraulic fluid between the blind end of the left hydraulic cylinder and the blind end of the right hydraulic cylinder.

In some aspects, a hydraulic system for a road reclaimer may include: a left hydraulic cylinder configured to adjust a position of a left propulsion device of the road reclaimer, the left hydraulic cylinder having a rod end and a blind end; a right hydraulic cylinder configured to adjust a position of a right propulsion device of the road reclaimer, the right hydraulic cylinder having a rod end and a blind end; a first valve set positionable to permit and prevent flow of hydraulic fluid between the rod end of the left hydraulic cylinder and the rod end of the right hydraulic cylinder; and a second valve set positionable to permit and prevent the flow of the hydraulic fluid between the blind end of the left hydraulic cylinder and the blind end of the right hydraulic cylinder.

In some aspects, a method of operating a mobile machine that may include a left rear propulsion device on a left side of the mobile machine, a right rear propulsion device on a right side of the mobile machine, and a hydraulic system including a left rear hydraulic cylinder having a rod end and a blind end and configured to adjust a height of the left rear propulsion device, a right rear hydraulic cylinder having a rod end and a blind end and configured to adjust a height of the right rear propulsion device, a first valve set between the rod end of the left rear hydraulic cylinder and the rod end of the right rear hydraulic cylinder, and a second valve set between the blind end of the left rear hydraulic cylinder and the blind end of the right rear hydraulic cylinder, the method may include: with a controller of the mobile machine: positioning the first valve set and the second valve set to prevent flow of hydraulic fluid between the left rear hydraulic cylinder and the right rear hydraulic cylinder when at least one of a speed of the mobile machine is above a first predetermined speed, a slope of the machine is above a first predetermined slope, or a travel time of the machine is below a predetermined travel time; and positioning the first valve set and the second valve set to permit the flow of the hydraulic fluid between the left rear hydraulic cylinder and right rear hydraulic cylinder when at least one of a speed of the mobile machine is below a second predetermined speed, a slope of the machine is below a second predetermined slope, or a travel time of the machine is above the predetermined travel time.

BRIEF DESCRIPTION OF THE DRAWINGS

The accompanying drawings, which are incorporated in and constitute a part of this Specification, illustrate various aspects of the disclosure, and, together with the description, serve to explain aspects of the disclosure.

FIG. 4 illustrates an exemplary method of operating the controller of FIG. 3, according to some aspects of the disclosure.

DETAILED DESCRIPTION

Both the foregoing general description and the following detailed description are exemplary and explanatory only, and do not restrict the claims. The terms "comprises," "comprising," "having," "including," or other variations thereof, used herein cover a non-exclusive inclusion such that a process, method, article, or apparatus that comprises a list of elements does not necessarily include only those elements, but may include other elements not expressly listed or inherent to such a process, method, article, or apparatus. Further, relative terms, such as, for example, "about," "substantially," "generally," "approximately," or other variations thereof, may include both a stated value and a possible variation of ±10% in the stated value, unless described otherwise. Still further, the terms "one or more," "at least one," and variations thereof, include one, two, or more than two (e.g., a plurality). Additionally, terms such as "top" and "bottom" are exemplary only and may refer to an orientation of a component in a particular figure or in installation or use, for example, but do not require that the component is oriented such that a "top" is above a "bottom."

Figure 1:
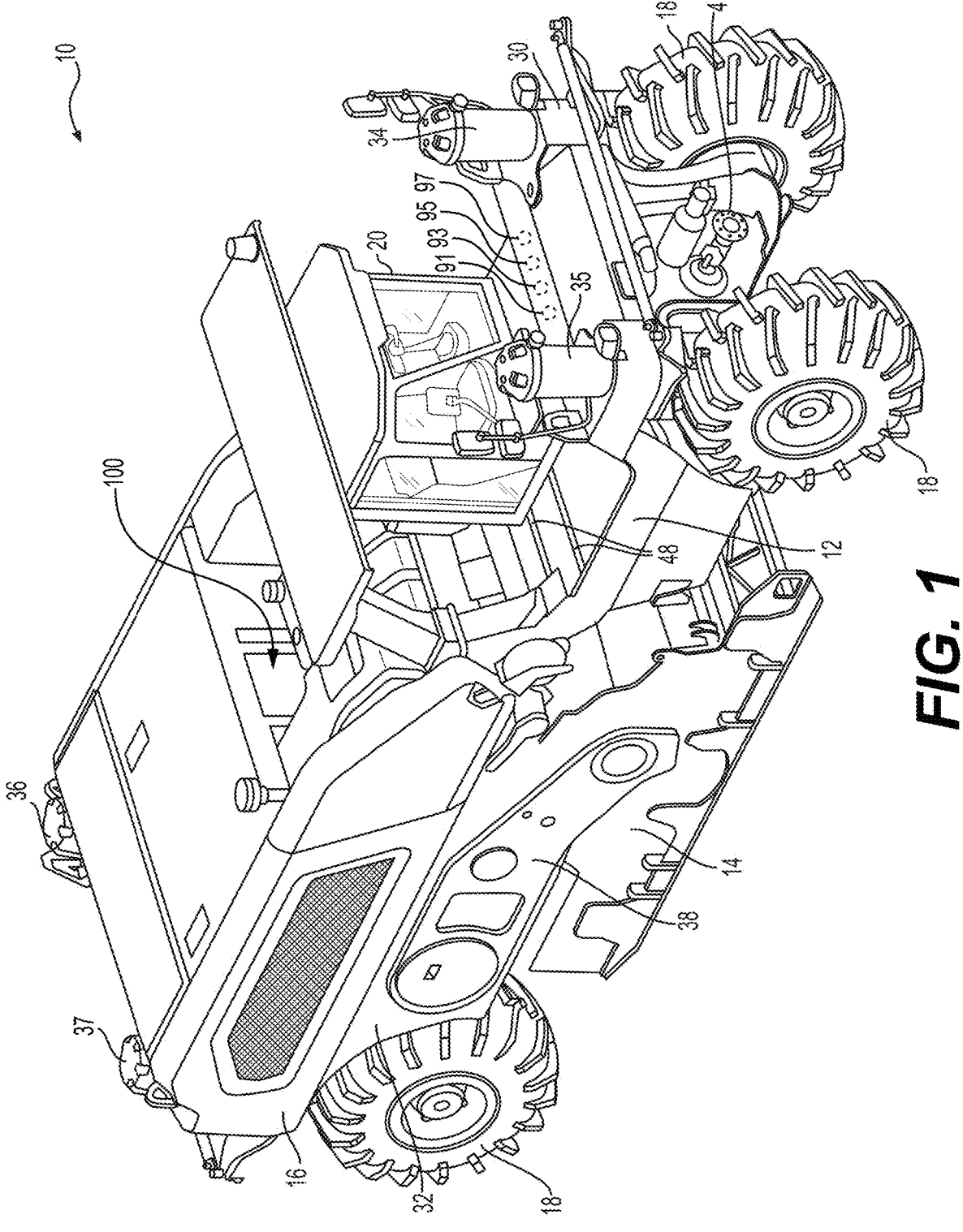
FIG. 1 illustrates a perspective view of an exemplary machine, according to some aspects of the disclosure.

FIG. 1 illustrates a perspective view of an exemplary machine 10, according to some aspects of the disclosure. Although FIG. 1 shows the machine 10 as a milling machine in the form of a road reclaimer (sometimes referred to as a "rotary mixer"), the machine 10 may be another machine, including another type of milling machine such as a cold planar or another machine, whether or not the machine may be used to perform work on or prior to construction of a road. As FIG. 1 shows, the machine 10 may include a frame 12, a rotor assembly 14, an engine system 16, tires 18, a cab 20, a speed sensor 91, a distance sensor 93, a slope sensor 95, and a time sensor 99, among other components, as further described. The frame 12 may support the rotor assembly 14. The frame 12 also or alternatively may support the engine system 16. The engine system 16 may be electrically, mechanically, hydraulically, and/or pneumatically connected to the rotor assembly 14, the tires 18, and other components of the machine 10 in order to provide power to the respective components. The cab 20 also or alternatively may be supported by the frame 12.

The machine 10 may be operated by an operator in the cab 20 and driven over pavement or other material on a ground surface, such as on a worksite. In other examples, the machine 10 may be an autonomous machine, or may be remotely controlled by an operator located remote from the machine 10. The rotor assembly 14 may be selectively deployable to pulverize a layer of the ground surface that is beneath or under the machine 10. The rotor assembly 14 may be disposed below the frame 12, and may be pivotally connected to the frame 12 via at least one swing arm 38 and a link assembly (not shown). The swing arms 38 and the link assembly may be positioned on a left and a right of the machine 10. As such, the rotor assembly 14 may be raised and lowered relative to the ground surface of the worksite over which the machine 10 is traversing. The rotor assembly 14 may be powered by the engine system 16. Although not shown, the rotor assembly 14 may include a plurality of cutting elements rotatably mounted on a rotor drum to grind or pulverize material from the ground surface, within an interior rotor chamber enclosed by the rotor assembly 14. The rotor assembly 14 may be fluidly coupled to a connection 41 positioned in a front portion of machine 10 such that water, emulsion, or another fluid may be delivered from an external source to the rotor assembly 14. The connection 41 may, for example, include a pump and/or a lock to securely deliver the fluid to the rotor assembly 14.

As FIG. 1 illustrates, in some examples, the machine 10 may include two of the tires 18 in the front portion of the machine 10 (e.g., a left front tire and a right front tire), and two of the tires 18 in a rear portion of the machine 10 (e.g., a left rear tire and a right rear tire). Alternatively, a different configuration of the tires 18 may be implemented in the machine 10. Moreover, although the figure shows the propulsion devices of the machine 10 in the form of the tires 18, the propulsion devices may include other traction units, such as crawler tracks or other traction units, used in conjunction with or in place of one or more of the tires 18, to propel the machine 10 across the ground surface.

The frame 12 may include a forward or front end 30 and a back or rear end 32. Two front hydraulic cylinders, including a left front hydraulic cylinder 34 and a right front hydraulic cylinder 35, may be disposed at the front end 30 of the frame 12. Two rear hydraulic cylinders, including a left rear hydraulic cylinder 36 and a right rear hydraulic cylinder 37, may be disposed at the rear end 32 of the frame 12. The machine 10 may include a hydraulic system 100, which controls each of the left front hydraulic cylinder 34, the right front hydraulic cylinder 35, the left rear hydraulic cylinder 36, and the right rear hydraulic cylinder 37, which in turn controls the position of each tire 18 (e.g., a distance or spacing between the frame 12 and each of the tires 18), as further described.

The cab 20 may be an at least partially enclosed structure mounted on the frame 12. The cab 20 may be positioned to the rear of the front end 30 of the frame 12, and forward of at least a portion of the rotor assembly 14. Thus, the cab 20 may be positioned on the frame 12 such that at least a portion of the rotor assembly 14 is disposed between the engine system 16 and the cab 20 in the longitudinal direction of the machine 10. At least a portion of the cab 20 may be above the rotor assembly 14, either toward the front portion of the machine 10 or directly above a portion of the rotor assembly 14. The cab 20 may be slidably mounted on one or more rails 48 extending transverse to the longitudinal direction of the machine 10. For example, one rail 48 may be positioned in front of the cab 20, and another rail 48 may be positioned behind the cab 20. As such, the cab 20 may be positioned in a center position (FIG. 1), a right position, a left position, and various positions between the left and right positions.

Figure 2:
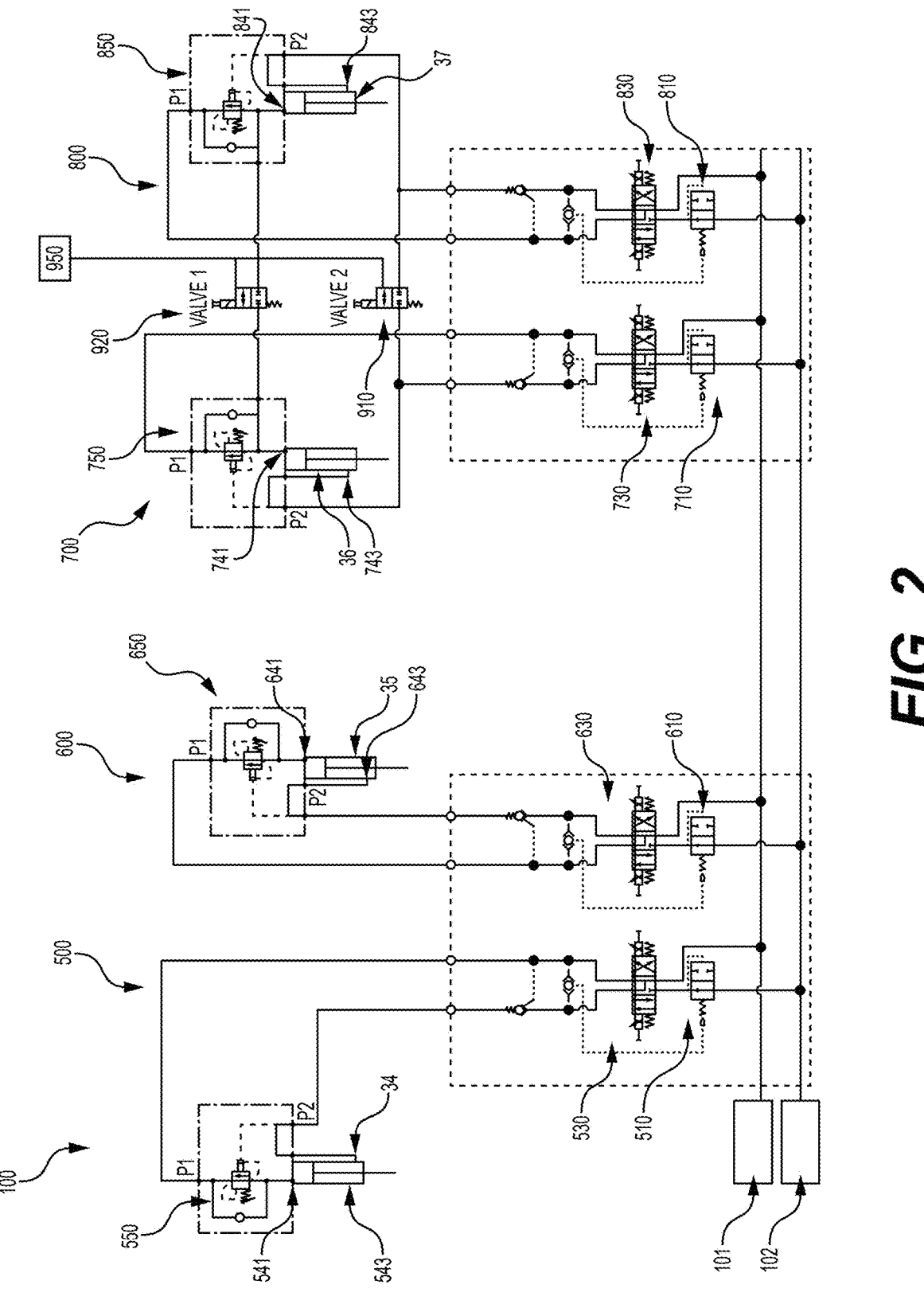
FIG. 2 illustrates a schematic diagram of an exemplary hydraulic system of the machine of FIG. 1, according to some aspects of the disclosure.

FIG. 2 illustrates a schematic diagram of the hydraulic system 100, according to some aspects of the disclosure. As FIG. 2 shows, the hydraulic system 100 includes four hydraulic subsystems, including a hydraulic subsystem 500 to control the left front hydraulic cylinder 34, a hydraulic subsystem 600 to control the right front hydraulic cylinder 35, a hydraulic subsystem 700 to control the left rear hydraulic cylinder 36, and a hydraulic subsystem 800 to control the right rear hydraulic cylinder 37, which in turn control the distance or spacing between the frame 12 and each of the tires 18 associated with each of the hydraulic cylinders (e.g., the left and right front tires, as well as the left and right rear tires). The hydraulic system 100 may include a tank 101 holding, retaining, receiving, or supplying the hydraulic fluid to other components of the hydraulic system 100, and a pump 102 that may receive the hydraulic fluid from the tank 101, pressurize the hydraulic fluid, and provide the pressurized hydraulic fluid to the hydraulic subsystem 500, the hydraulic subsystem 600, the hydraulic subsystem 700, or the hydraulic subsystem 800, as further described.

The following description is provided with reference to hydraulic subsystem 500, which may control the distance or spacing between the frame 12 and the left front hydraulic cylinder 34 and thus the distance or spacing between the frame 12 and the tire 18 associated with the left front hydraulic cylinder (e.g., the left front tire). However, the disclosure is equally applicable to the hydraulic subsystem 600, the hydraulic subsystem 700, or the hydraulic subsystem 800, except as otherwise indicated.

The hydraulic subsystem 500 may include a first valve set 510. The first valve set 510 may be positionable to lock the position of the left front hydraulic cylinder 34 by preventing hydraulic fluid from flowing into or out of the left front hydraulic cylinder 34. The first valve set 510 may be positionable to adjust the position of the left front hydraulic cylinder 34 by permitting the hydraulic fluid to flow into and out of the left front hydraulic cylinder 34, as further described. The hydraulic subsystem 500 may include a second valve set 530. The second valve set 530 may be positionable to adjust the flow of the hydraulic fluid pressurized by the pump 102 into a blind end 541 of the left front hydraulic cylinder 34, and to allow hydraulic fluid to flow out of a rod end 543 of the left front hydraulic cylinder 34 to the tank 101. Flowing the hydraulic fluid into the blind end 541 and out of the rod end 543 extends a rod within the left front hydraulic cylinder 34 from the rod end 543, while flowing the hydraulic fluid out of the blind end 541 and into of the rod end 543 retracts the rod within the left front hydraulic cylinder 34. The second valve set 530 may be positionable to allow the flow of the hydraulic fluid pressurized by the pump 102 into the rod end 543 of the left front hydraulic cylinder 34, and to flow hydraulic fluid out of the blind end 541 of the left front hydraulic cylinder 34 to the tank 101. Accordingly, the position of the left front hydraulic cylinder 34 may be adjusted. The hydraulic subsystem 500 may include a third valve set 550. The third valve set 550 may provide pressure relief, for example, in the event of an overpressurization of the hydraulic subsystem 500.

As discussed, the hydraulic subsystem 600, the hydraulic subsystem 700, or the hydraulic subsystem 800 may include similar components as the hydraulic subsystem 500, and may operate in a manner similar to the hydraulic subsystem 500. Thus, for example, the hydraulic subsystem 600 may include a first valve set 610, a second valve set 630, a third valve set 650, a blind end 641 of the right front hydraulic cylinder 35, and a rod end 643 of the right front hydraulic cylinder 35. The hydraulic subsystem 700 may include a first valve set 710, a second valve set 730, a third valve set 750, a blind end 741 of the left rear hydraulic cylinder 36, and a rod end 743 of the left rear hydraulic cylinder 36. The hydraulic subsystem 800 may include a first valve set 810, a second valve set 830, a third valve set 850, a blind end 841 of the right rear hydraulic cylinder 37, and a rod end 843 of the right rear hydraulic cylinder 37.

Each of the hydraulic subsystem 500, the hydraulic subsystem 600, the hydraulic subsystem 700, and the hydraulic subsystem 800 may be controlled independently, in pairs, or all together (all four hydraulic subsystems 500, 600, 700, and 800), such as by an operator of the machine 10, to thereby independently control the distance or spacing between the frame 12 and the tires 18, by positioning the first valve sets 510, 610, 710, and 810, and the second valve sets 530, 630, 730, and 830.

The hydraulic system 100 may include a controller 950. The controller 950 may embody a single microprocessor or multiple microprocessors for performing any of the operations mentioned herein. In some aspects of the disclosure, the controller 950 may include a memory, a secondary storage device, a processor, such as a central processing unit, or any other system for accomplishing a task consistent with the present disclosure. The memory or secondary storage device associated with the controller 950 may be non-transitory computer-readable media that stores data or software routines that may assist the controller 950 in performing its functions, such as the functions of method or process discussed with reference to FIGS. 3 and 4 below. Further, the memory or secondary storage device associated with the controller 950 may also store data received from the various inputs or sensors associated with the machine 10, including the inputs and outputs discussed below. Numerous commercially available microprocessors may be configured to perform one or more of the functions of the controller 950. In some aspects of the disclosure, the controller 950 may include a general machine controller capable of controlling numerous other machine functions. Various other known circuits may be associated with the controller 950, including signal-conditioning circuitry, communication circuitry, hydraulic or other actuation circuitry, or other appropriate circuitry.

With reference to FIG. 2, the hydraulic system 100 may include a first bolster valve set 910 and a second bolster valve set 920. The first bolster valve set 910 may be positionable to prevent the flow of the hydraulic fluid between the rod end 743 of the left rear hydraulic cylinder 36 and the rod end 843 of the right rear hydraulic cylinder 37. The first bolster valve set 910 may also be positionable to permit the flow of the hydraulic fluid between the rod end 743 of the left rear hydraulic cylinder 36 and the rod end 843 of the right rear hydraulic cylinder 37. The second bolster valve set 920 may be positionable to prevent the flow of the hydraulic fluid between the blind end 741 of the left rear hydraulic cylinder 36 and the blind end 841 of the right rear hydraulic cylinder 37. The second bolster valve set 920 may be positionable to permit the flow of the hydraulic fluid between the blind end 741 of the left rear hydraulic cylinder 36 and the blind end 841 of the right rear hydraulic cylinder 37. In some instances, the hydraulic cylinders are on opposite left and right sides of the machine 10.

The controller 950 may be configured to control operation of the first bolster valve set 910 and the second bolster valve set 920, as further shown and described. For example, the controller 950 may be configured to operate the first bolster valve set 910 and the second bolster valve set 920 in a first operating mode, in which the first bolster valve set 910 is positioned to prevent the flow of the hydraulic fluid between the rod end 743 of the left rear hydraulic cylinder 36 and the rod end 843 of the right rear hydraulic cylinder 37, and in which the second bolster valve set 920 is positioned to prevent the flow of the hydraulic fluid between the blind end 741 of the left rear hydraulic cylinder 36 and the blind end 841 of the right rear hydraulic cylinder 37. The controller 950 may be configured to operate the first bolster valve set 910 and the second bolster valve set 920 in a second operating mode, in which the first bolster valve set 910 is positioned to permit the flow of the hydraulic fluid between the rod end 743 of the left rear hydraulic cylinder 36 and the rod end 843 of the right rear hydraulic cylinder 37, and in which the second bolster valve set 920 is positioned to permit the flow of the hydraulic fluid between the blind end 741 of the left rear hydraulic cylinder 36 and the blind end 841 of the right rear hydraulic cylinder 37.

Figure 3:
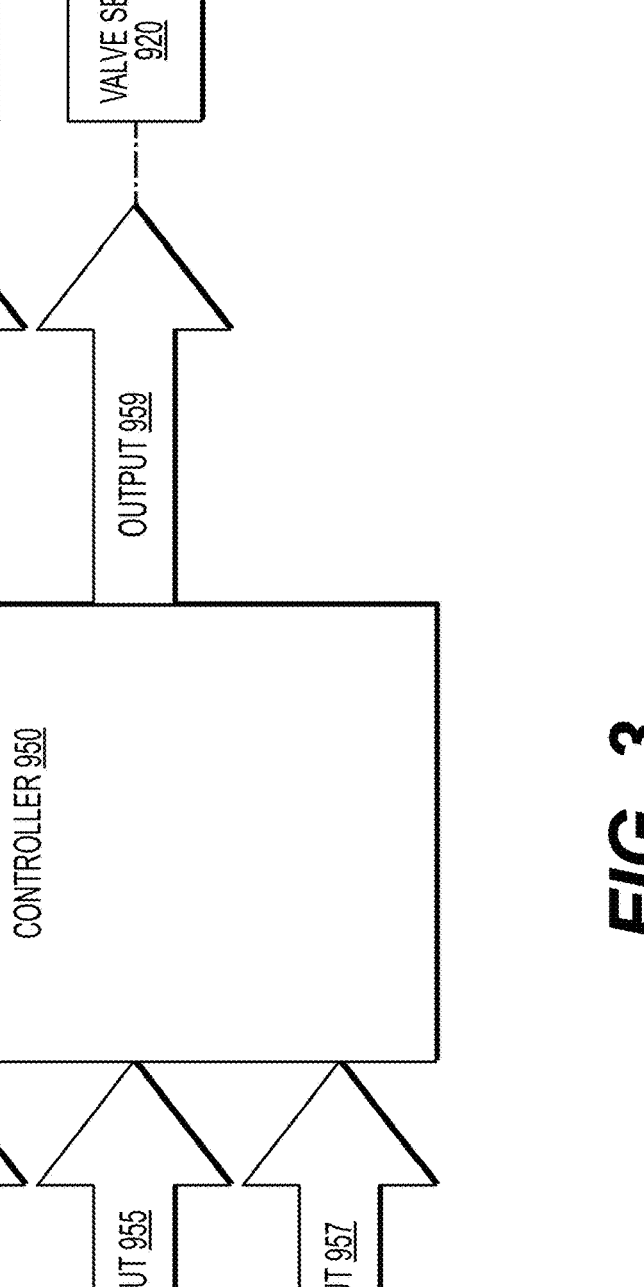
FIG. 3 illustrates a block diagram of an exemplary controller of the hydraulic system of FIG. 2, according to some aspects of the disclosure.

FIG. 3 is a block diagram of the controller 950, according to some aspects of the disclosure. As FIG. 3 illustrates, the controller 950 may receive one or more inputs, and provide one or more outputs, for example, to automatically control (e.g., control without operator intervention or selection) the left rear hydraulic cylinder 36 and the right rear hydraulic cylinder 37. In some aspects the output may automatically control between i) the first operating mode (referred to as "independent control mode") in which the first bolster valve set 910 and the second bolster valve set 920 are positioned to prevent the flow of the hydraulic fluid between the left rear hydraulic cylinder 36 and the right rear hydraulic cylinder 37, and ii) a second operating mode (referred to as "bolster control mode") in which the first bolster valve set 910 and the second bolster valve set 920 are positioned to permit the flow of the hydraulic fluid between the left rear hydraulic cylinder 36 and the right rear hydraulic cylinder 37. The bolster control mode may provide the bolstering effect to the machine 10, as further described.

As FIG. 3 shows, the one or more inputs to the controller 950 may include an input 951, which is indicative of a travel speed of the machine 10 across the ground surface, such as from the speed sensor 91. The inputs may include an input 953, which is indicative of a distance the machine 10 has traveled, such as during a current trip across the ground surface and since the machine 10 last stopped and began traveling again, such as from the distance sensor 93. The inputs may include an input 955, which is indicative of an angle or slope of the machine (e.g., a slope of the frame 12 or another portion of the machine 10) on the ground surface of the worksite, such as from the slope sensor 95. The inputs may include an input 957, which indicates an elapsed time of travel of the machine 10, such as during a current trip across the ground surface and since the machine 10 last stopped and began traveling again, such as from the time sensor 97. In some instances, the controller 950 may compare one or more of the inputs to one or more predetermined thresholds or values, which may be stored in the controller 950, and when one or more of the inputs is above or below the predetermined threshold or value, the controller 950 may transition between the first operating mode and the second operating mode. Further, it is understood that one or more of the inputs 951, 953, 955, and 957 may be provided by other sensors, and that one or more of the above sensors, or other sensors, may provide multiple inputs to the controller 950.

By way of example, the controller 950 may control the left rear hydraulic cylinder 36 and the right rear hydraulic cylinder 37 to be in independent control mode when the travel speed of the machine 10, based on input 951, is above a threshold speed (e.g., a first threshold speed of 6 kph), or to be in bolster control mode when the travel speed of the machine 10 is below a threshold speed (e.g., a second threshold speed of 3.5 kph). The controller 950 may control the left rear hydraulic cylinder 36 and the right rear hydraulic cylinder 37 to be in independent control mode when the distance the machine 10 has traveled since the last stop, based on input 953, is less than a threshold distance, or to be in bolster control mode when the travel distance of the machine 10 is above the threshold distance. The controller 950 may control the left rear hydraulic cylinder 36 and the right rear hydraulic cylinder 37 to be in independent control mode when the slope of the machine 10, based on input 955, is above a threshold slope (e.g., a first threshold slope of 10%), or to be in bolster control mode when the slope of the machine 10 is below a threshold slope (e.g., a second threshold slope of 8%). The controller 950 may control the left rear hydraulic cylinder 36 and the right rear hydraulic cylinder 37 to be in independent control mode when the elapsed travel time, based on input 957, is above a threshold travel time (e.g., 5 seconds), or to be in bolster control mode when the elapsed time is below the threshold travel time.

The controller 950 may provide one or more outputs 959, which provides a signal or instruction to both the first bolster valve set 910 and the second bolster valve set 920. For example, the output(s) 959 may instruct the first bolster valve set 910 and the second bolster valve set 920 either to prevent or permit the flow of the hydraulic fluid between the left rear hydraulic cylinder 36 and the right rear hydraulic cylinder 37 (e.g., in the independent control mode or the bolster control mode), as described. In some aspects of the disclosure, the controller 950 may operate to open the first bolster valve set 910 and the second bolster valve set 920 together, or to close the first bolster valve set 910 and the second bolster valve set 920 together.

INDUSTRIAL APPLICABILITY

The disclosure may provide systems and methods associated with the hydraulic system 100 of the machine 10, illustrated as a milling machine in the form of a rotary mixer, although the machine 10 may be in the form of a milling machine, such as a cold planar. In at least some aspects of the disclosure, the hydraulic system 100 may allow the left rear hydraulic cylinder 36 and the right rear hydraulic cylinder 37 of the machine 10 to operate independently of each other, such that the hydraulic subsystem 700 may independently control the distance or spacing between the frame 12 and the left rear hydraulic cylinder 36 (and thus its associated tire 18), and the hydraulic subsystem 800 may independently control the distance or spacing between the frame 12 and the right rear hydraulic cylinder 37 (and thus its associated tire 18). In at least some other aspects of the disclosure, the hydraulic system 100 may allow the left rear hydraulic cylinder 36 and the right rear hydraulic cylinder 37 to operate in conjunction with one another, for example, with at least a portion of the hydraulic subsystem 700 fluidly connected to at least a portion of the hydraulic subsystem 800, thereby helping to provide a bolstering effect to the machine 10, for example, providing or maintaining better contact between the propulsion devices of the machine 10, such as the tires 18, and the ground surface of the worksite.

As disclosed, according to some aspects of the disclosure, the hydraulic fluid may flow between the blind end 741 of the left rear hydraulic cylinder 36 and the blind end 841 of the right rear hydraulic cylinder 37, and the hydraulic fluid may flow between the rod end 743 of the left rear hydraulic cylinder 36 and the rod end 843 of the right rear hydraulic cylinder 37, by appropriately positioning the first bolster valve set 910 and the second bolster valve set 920. Permitting the hydraulic fluid to flow between the left rear hydraulic cylinder 36 and the right rear hydraulic cylinder 37 may help to provide or maintain better contact between the propulsion devices of the machine 10, such as the tires 18, and the ground surface of the worksite.

FIG. 4 illustrates an exemplary method 400 of operating the controller 950, according to some aspects of the disclosure. The method 400 may include a step 410 that includes positioning the first bolster valve set 910 and the second bolster valve set 920 to prevent the flow of the hydraulic fluid between the left front hydraulic cylinder 34 and the right front hydraulic cylinder 35 when the input does not meet a condition, such as one or more predetermined conditions. The method 400 may include a step 420 that includes positioning the first bolster valve set 910 and the second bolster valve set 920 to permit the flow of the hydraulic fluid between the left front hydraulic cylinder 34 and the right front hydraulic cylinder 35 when an input meets one or more predetermined conditions. The method 400 may include additional or other steps, and, for example, steps 410 and 420 may be in a different order than as shown and described.

Thus, the machine 10 including the hydraulic system 100 with the first bolster valve set 910 and the second bolster valve set 920 may provide advantages compared to machines that does not include the disclosed and illustrated hydraulic system 100. For example, by permitting the hydraulic fluid to flow between the left rear hydraulic cylinder 36 and the right rear hydraulic cylinder 37 under certain conditions, the hydraulic system 100 may prevent one or more of the tires 18 from coming out of the contact with the ground surface of the worksite. The hydraulic system 100 also may operate to provide the bolstering effect automatically without operator intervention.

It will be apparent to those skilled in the art that various modifications and variations may be made to the disclosed system without departing from the scope of the disclosure. Other aspects of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A mobile machine, comprising:
a frame;
a plurality of propulsion devices supported by the frame, the plurality of propulsion devices including at least a left propulsion device on a left side of the mobile machine, and a right propulsion device on a right side of the mobile machine; and
a hydraulic system, comprising:
a left hydraulic cylinder configured to adjust a distance between the frame and the left propulsion device, the left hydraulic cylinder comprising a rod end and a blind end;
a right hydraulic cylinder configured to adjust a distance between the frame and the right propulsion device, the right hydraulic cylinder comprising a rod end and a blind end;
a first valve set movable between positions permitting and preventing flow of hydraulic fluid between the rod end of the left hydraulic cylinder and the rod end of the right hydraulic cylinder; and
a second valve set movable between positions permitting and preventing the flow of the hydraulic fluid between the blind end of the left hydraulic cylinder and the blind end of the right hydraulic cylinder,
wherein positioning the first and second valve sets in the positions preventing flow prevents fluid from flowing between the left and right hydraulic cylinders.

2. The mobile machine of claim 1, further comprising:
a rotor assembly supported by the frame, wherein the rotor assembly is selectively deployable to pulverize a layer of a ground surface under the mobile machine.

3. The mobile machine of claim 1, wherein the hydraulic system further comprises:
a tank supported by the frame, the tank configured to retain the hydraulic fluid and to supply the hydraulic fluid; and
a pump supported by the frame, the pump configured to receive the hydraulic fluid from the tank, to pressurize the received hydraulic fluid, and to flow the pressurized hydraulic fluid to the left hydraulic cylinder and the right hydraulic cylinder.

4. The mobile machine of claim 1, wherein the left propulsion device comprises a left rear propulsion device on a left rear portion of the mobile machine,
wherein the right propulsion device comprises a right rear propulsion device on a right rear portion of the mobile machine,
wherein the left hydraulic cylinder comprises a left rear hydraulic cylinder on the left rear portion of the mobile machine,
wherein the right hydraulic cylinder comprises a right rear hydraulic cylinder on the right rear portion of the mobile machine.

5. The mobile machine of claim 4, wherein the plurality of propulsion devices includes a left front propulsion device on a left front portion of the mobile machine, and a right front propulsion device on a right front portion of the mobile machine,
wherein the hydraulic system further comprises:
a left front hydraulic cylinder configured to adjust a distance between the frame and the left front propulsion device; and
a right front hydraulic cylinder configured to adjust a distance between the frame and the right front propulsion device.

6. The mobile machine of claim 4, wherein the hydraulic system further comprises a controller configured to operate the first valve set and the second valve set in a first mode and a second mode, such that:
in the first mode, the controller positions the first valve set to prevent the flow of the hydraulic fluid between the rod end of the left rear hydraulic cylinder and the rod end of the right rear hydraulic cylinder, and positions the second valve set to prevent the flow of the hydraulic fluid between the blind end of the left rear hydraulic cylinder and the blind end of the right rear hydraulic cylinder, and
in the second mode, the controller positions the first valve set to permit the flow of the hydraulic fluid between the rod end of the left rear hydraulic cylinder and the rod end of the right rear hydraulic cylinder, and positions the second valve set to permit the flow of the hydraulic fluid between the blind end of the left rear hydraulic cylinder and the blind end of the right rear hydraulic cylinder.

7. The mobile machine of claim 1, wherein the hydraulic system further comprises a controller configured to operate the first valve set and the second valve set in a first mode and a second mode, such that in the first mode the controller positions the first valve set to prevent the flow of the hydraulic fluid between the rod end of the left hydraulic cylinder and the rod end of the right hydraulic cylinder, and positions the second valve set to prevent the flow of the hydraulic fluid between the blind end of the left hydraulic cylinder and the blind end of the right hydraulic cylinder, and such that in the second mode the controller positions the first valve set to permit the flow of the hydraulic fluid between the rod end of the left hydraulic cylinder and the rod end of the right hydraulic cylinder, and positions the second valve set to permit the flow of the hydraulic fluid between the blind end of the left hydraulic cylinder and the blind end of the right hydraulic cylinder.

8. The mobile machine of claim 7, wherein the controller is configured to operate the first valve set and the second valve set in the first mode or the second mode based on at least one of a speed of the mobile machine, a distance the mobile machine has traveled, a slope of the mobile machine, or an elapsed travel time of the mobile machine.

9. The mobile machine of claim 1, wherein each of the left propulsion device and the right propulsion device are on a same end of the mobile machine, wherein each of the left hydraulic cylinder and the right hydraulic cylinder are on the same end of the mobile machine as the left propulsion device and the right propulsion device.

10. A hydraulic system for a road reclaimer, the hydraulic system comprising:

a left hydraulic cylinder configured to adjust a position of a left propulsion device of the road reclaimer, the left hydraulic cylinder comprising a rod end and a blind end;

a right hydraulic cylinder configured to adjust a position of a right propulsion device of the road reclaimer, the right hydraulic cylinder comprising a rod end and a blind end;

a first valve set positionable to permit and prevent flow of hydraulic fluid between the rod end of the left hydraulic cylinder and the rod end of the right hydraulic cylinder; and a second valve set positionable to permit and prevent the flow of the hydraulic fluid between the blind end of the left hydraulic cylinder and the blind end of the right hydraulic cylinder, wherein the rod end of the right hydraulic cylinder is not fluidly connected to the blind end of the left hydraulic cylinder.

11. The hydraulic system of claim 10, further comprising:

a tank configured to retain the hydraulic fluid and to supply the hydraulic fluid; and a pump configured to receive the hydraulic fluid from the tank, to pressurize the received hydraulic fluid, and to flow the pressurized hydraulic fluid to the left hydraulic cylinder and the right hydraulic cylinder.

12. The hydraulic system of claim 10, wherein the left hydraulic cylinder comprises a left rear hydraulic cylinder configured to be installed on a left rear portion of the road reclaimer, wherein the right hydraulic cylinder comprises a right rear hydraulic cylinder configured to be installed on a right rear portion of the road reclaimer.

13. The hydraulic system of claim 12, wherein the hydraulic system further comprises:

a left front hydraulic cylinder configured to adjust a position of a left front propulsion device of the road reclaimer; and a right front hydraulic cylinder configured to adjust a position of a right front propulsion device of the road reclaimer.

14. The hydraulic system of claim 12, wherein the hydraulic system further comprises a controller configured to operate the first valve set and the second valve set in a first mode and a second mode, such that in the first mode the controller positions the first valve set to prevent the flow of the hydraulic fluid between the rod end of the left rear hydraulic cylinder and the rod end of the right rear hydraulic cylinder, and positions the second valve set to prevent the flow of the hydraulic fluid between the blind end of the left rear hydraulic cylinder and the blind end of the right rear hydraulic cylinder, and such that in the second mode the controller positions the first valve set to permit the flow of the hydraulic fluid between the rod end of the left rear hydraulic cylinder and the rod end of the right rear hydraulic cylinder, and positions the second valve set to permit the flow of the hydraulic fluid between the blind end of the left rear hydraulic cylinder and the blind end of the right rear hydraulic cylinder.

15. The hydraulic system of claim 10, wherein the hydraulic system further comprises a controller configured to operate the first valve set and the second valve set in a first mode and a second mode, such that in the first mode the controller positions the first valve set to prevent the flow of the hydraulic fluid between the rod end of the left hydraulic cylinder and the rod end of the right hydraulic cylinder, and positions the second valve set to prevent the flow of the hydraulic fluid between the blind end of the left hydraulic cylinder and the blind end of the right hydraulic cylinder, and such that in the second mode the controller positions the first valve set to permit the flow of the hydraulic fluid between the rod end of the left hydraulic cylinder and the rod end of the right hydraulic cylinder, and positions the second valve set to permit the flow of the hydraulic fluid between the blind end of the left hydraulic cylinder and the blind end of the right hydraulic cylinder.

16. The hydraulic system of claim 15, wherein the controller is configured to operate the first valve set and the second valve set in the first mode or the second mode based on at least one of a speed of the road reclaimer, a distance the road reclaimer has traveled, a slope of the road reclaimer, or an elapsed travel time of the road reclaimer.

17. The hydraulic system of claim 10, further comprising a controller, wherein the controller is configured to control the first valve set and the second valve set to open together, and to control the first valve set and the second valve set to close together.

18. A method of operating a mobile machine including a left rear propulsion device on a left side of the mobile machine, a right rear propulsion device on a right side of the mobile machine, and a hydraulic system including a left rear hydraulic cylinder having a rod end and a blind end and configured to adjust a height of the left rear propulsion device, a right rear hydraulic cylinder having a rod end and a blind end and configured to adjust a height of the right rear propulsion device, a first valve set between the rod end of the left rear hydraulic cylinder and the rod end of the right rear hydraulic cylinder, and a second valve set between the blind end of the left rear hydraulic cylinder and the blind end of the right rear hydraulic cylinder, the method comprising:

with a controller of the mobile machine:

positioning the first valve set and the second valve set to prevent flow of hydraulic fluid between the left rear hydraulic cylinder and the right rear hydraulic cylinder when at least one of a slope of the machine is above a first predetermined slope or a travel time of the machine is below a predetermined travel time; and positioning the first valve set and the second valve set to permit the flow of the hydraulic fluid between the left rear hydraulic cylinder and right rear hydraulic cylinder when at least one of the slope of the machine is below a second predetermined slope or the travel time of the machine is above the predetermined travel time.

19. The method of claim 18, wherein positioning the first valve set and the second valve set to permit flow comprises:

positioning the first valve set to permit the flow of the hydraulic fluid between the blind ends of the left rear hydraulic cylinder and the right rear hydraulic cylinder, and positioning the second valve set to permit the flow of the hydraulic fluid between the rod ends of the left rear hydraulic cylinder and the right rear hydraulic cylinder.

20. The method of claim 18, wherein positioning the first valve set and the second valve set to prevent flow comprises: 5 positioning the first valve set to prevent the flow of the hydraulic fluid between the blind ends of the left rear hydraulic cylinder and the right rear hydraulic cylinder, and positioning the second valve set to prevent the flow of the hydraulic fluid between the rod ends of the left 10 rear hydraulic cylinder and the right rear hydraulic cylinder.

* * * * *